US009148466B2

(12) United States Patent
Fay et al.

(10) Patent No.: US 9,148,466 B2
(45) Date of Patent: Sep. 29, 2015

(54) PRESENTING MODULES IN A BROWSER

(75) Inventors: Karen Fay, Raleigh, NC (US); Renaud Waldura, San Francisco, CA (US); Michael Chow, San Jose, CA (US); Mike Wexler, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1054 days.

(21) Appl. No.: 12/898,655

(22) Filed: Oct. 5, 2010

(65) Prior Publication Data

US 2012/0084347 A1    Apr. 5, 2012

(51) Int. Cl.
G06F 15/16    (2006.01)
H04L 29/08    (2006.01)

(52) U.S. Cl.
CPC ............ H04L 67/02 (2013.01); H04L 67/2842 (2013.01)

(58) Field of Classification Search
USPC .......................................... 709/203
See application file for complete search history.

(56) References Cited

U.S. PATENT DOCUMENTS

| 6,332,163 | B1 * | 12/2001 | Bowman-Amuah | 709/231 |
|---|---|---|---|---|
| 6,434,568 | B1 * | 8/2002 | Bowman-Amuah | 1/1 |
| 6,438,594 | B1 * | 8/2002 | Bowman-Amuah | 709/225 |
| 6,477,580 | B1 * | 11/2002 | Bowman-Amuah | 709/231 |
| 6,496,850 | B1 * | 12/2002 | Bowman-Amuah | 709/203 |
| 6,529,948 | B1 * | 3/2003 | Bowman-Amuah | 709/217 |
| 6,549,949 | B1 * | 4/2003 | Bowman-Amuah | 709/236 |
| 6,564,251 | B2 * | 5/2003 | Katariya et al. | 709/214 |
| 6,571,282 | B1 * | 5/2003 | Bowman-Amuah | 709/219 |
| 6,578,068 | B1 * | 6/2003 | Bowman-Amuah | 709/203 |
| 6,606,660 | B1 * | 8/2003 | Bowman-Amuah | 709/227 |
| 6,615,253 | B1 * | 9/2003 | Bowman-Amuah | 709/219 |
| 6,640,238 | B1 * | 10/2003 | Bowman-Amuah | 709/201 |
| 6,640,244 | B1 * | 10/2003 | Bowman-Amuah | 709/207 |
| 6,640,249 | B1 * | 10/2003 | Bowman-Amuah | 709/228 |
| 6,742,015 | B1 * | 5/2004 | Bowman-Amuah | 718/101 |
| 6,785,704 | B1 * | 8/2004 | McCanne | 718/105 |
| 8,126,930 | B2 * | 2/2012 | Shukla et al. | 707/802 |
| 2003/0088580 | A1 * | 5/2003 | Desai et al. | 707/104.1 |
| 2009/0281989 | A1 * | 11/2009 | Shukla et al. | 707/3 |
| 2009/0282013 | A1 * | 11/2009 | Joshi et al. | 707/5 |
| 2010/0153544 | A1 * | 6/2010 | Krassner et al. | 709/224 |
| 2010/0228712 | A1 * | 9/2010 | Wexler et al. | 707/706 |
| 2010/0235329 | A1 * | 9/2010 | Koren et al. | 707/687 |
| 2010/0235473 | A1 * | 9/2010 | Koren et al. | 709/219 |

* cited by examiner

Primary Examiner — Hua Fan
(74) Attorney, Agent, or Firm — Martine Penilla Group, LLP

(57) ABSTRACT

Module management software receives a request from the browser for a presentation composed of at least one module. The module management software transmits a request for module data associated with the module to a first server that caches the module data after retrieving the module data from a website. The module management software then receives the requested module data from the first server and transmits a request for each of the resource files described in the module data to a second server that caches each of the resource files after retrieving the resource file from an external (or internal) website. Each request for a resource file can be handled by a corresponding thread. The module management software delays transmission of the module data to the browser, if any requested resource file is not received within a time limit derived at least in part from a service level agreement.

20 Claims, 12 Drawing Sheets

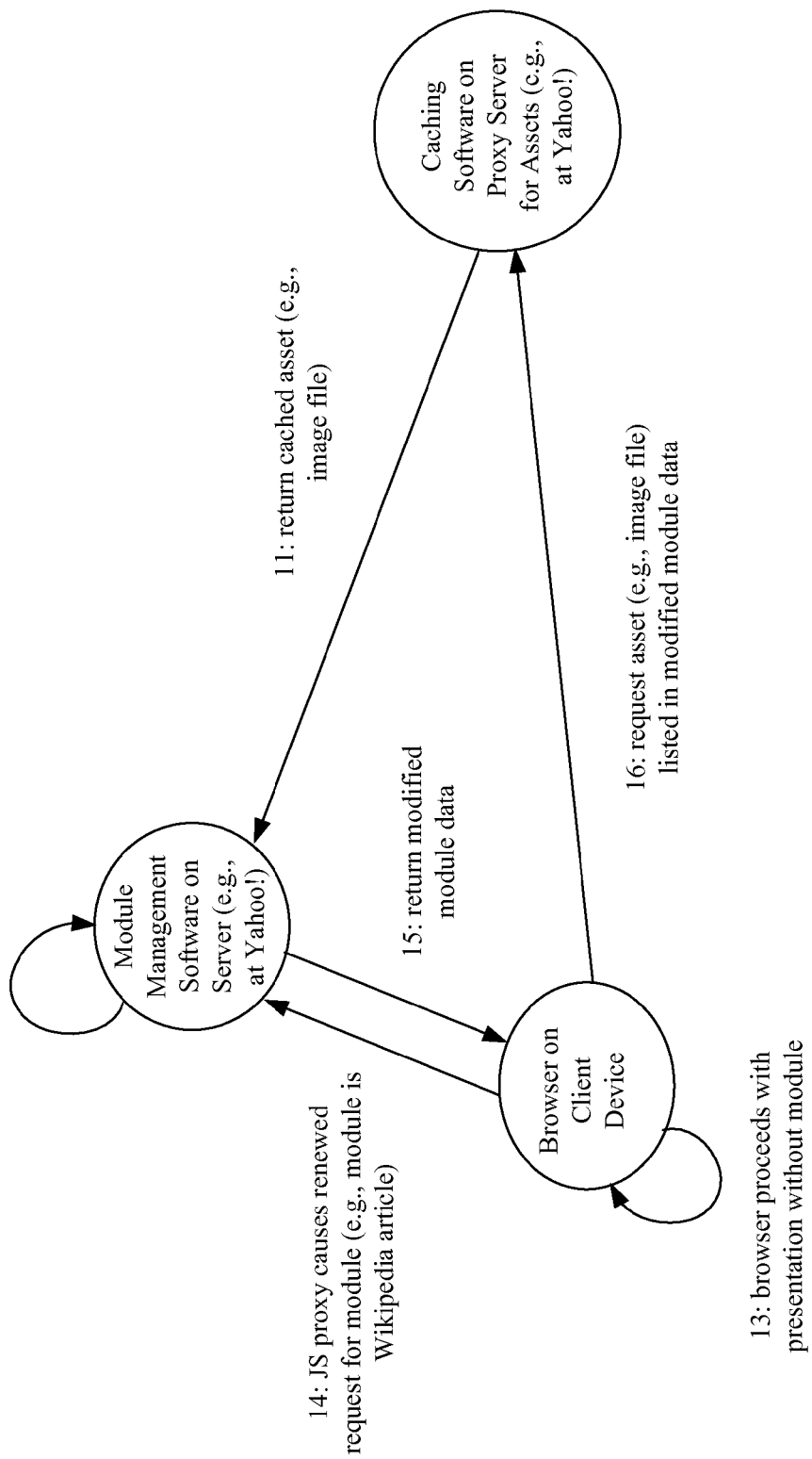

PRESENTING MODULES IN A BROWSER

BACKGROUND

As discussed in co-owned U.S. patent application Ser. No. 12/116,195 entitled "Algorithmically Generated Topic Pages" and co-owned U.S. patent application Ser. No. 12/116,198 entitled "Micro-Bucket Testing for Page Optimization", now U.S. Pat. No. 8,126,930, all of which are hereby incorporated by reference, presentations in browsers can be composed of modules with rich media such as images, video, and audio. An example of such a module is a Wikipedia article on a particular topic, which might be presented in a web page related to that topic by a provider or website such as Yahoo! or Google in a browser. Another example is a rich multimedia advertisement.

Presenting such media to a browser entails significant latencies, even over a broadband connection. Moreover providers, such as Yahoo! and Google, have service level agreements (SLAs) that include requirements involving such latencies. For example, a service level agreement might require that a specific web page be displayed "within 800 milliseconds, 99.85% of the time."

Web caches significantly help in reducing these latencies. However, cache misses are inevitable in a world where web pages are added and changed almost continuously. If cache misses are frequent enough, SLA requirements might not be met and revenue might be lost.

SUMMARY

In a first example embodiment, a processor-executed method is described for managing a presentation in a browser. According to the method, module management software receives a request from the browser for a presentation composed of at least one module. The module management software transmits a request for module data associated with the module to a first server that caches the module data after retrieving the module data from another website, which might be an external website in an example embodiment. The module management software then receives the requested module data from the first server and transmits a request for each of the resource files described in the module data to a second server that caches each of the resource files after retrieving the resource file from an external (or internal) website. The module management software delays transmission of the module data to the browser, if any requested resource file is not received within a time limit derived at least in part from a service level agreement.

In a second example embodiment, an apparatus is described, namely, a computer-readable storage medium which persistently stores a program that manages modules presented in a browser. When executed, the program receives a request from a browser for a presentation composed of at least one module. The program transmits a request for module data associated with the module to a first server that caches the module data after retrieving the module data from a website. The program then receives the requested module data from the first server and transmits a request for each of the resource files described in the module data to a second server that caches each of the resource files after retrieving the resource file from another website, which might be an external website in an example embodiment. The program delays transmission of the module data to the browser, if any requested resource file is not received within a time limit derived at least in part from a service level agreement.

In a third example embodiment, a processor-executed method is described for managing a presentation in a browser. According to the method, module management software receives a request from the browser for a presentation composed of at least one module. The module management software transmits a request for each of the resource files described in the module data associated with the module to a second server that caches each of the resource files after retrieving the resource file from a website. The module management software delays transmission of the module data to the browser, if any requested resource file is not received within a time limit derived at least in part from a service level agreement.

Other aspects and advantages of the invention will become apparent from the following detailed description, taken in conjunction with the accompanying drawings, which illustrates by way of example the principles of the invention.

BRIEF DESCRIPTION OF THE DRAWINGS

FIGS. 6A through 6C are communication diagrams that illustrate a process that involves a cache miss on a proxy server that caches module data, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
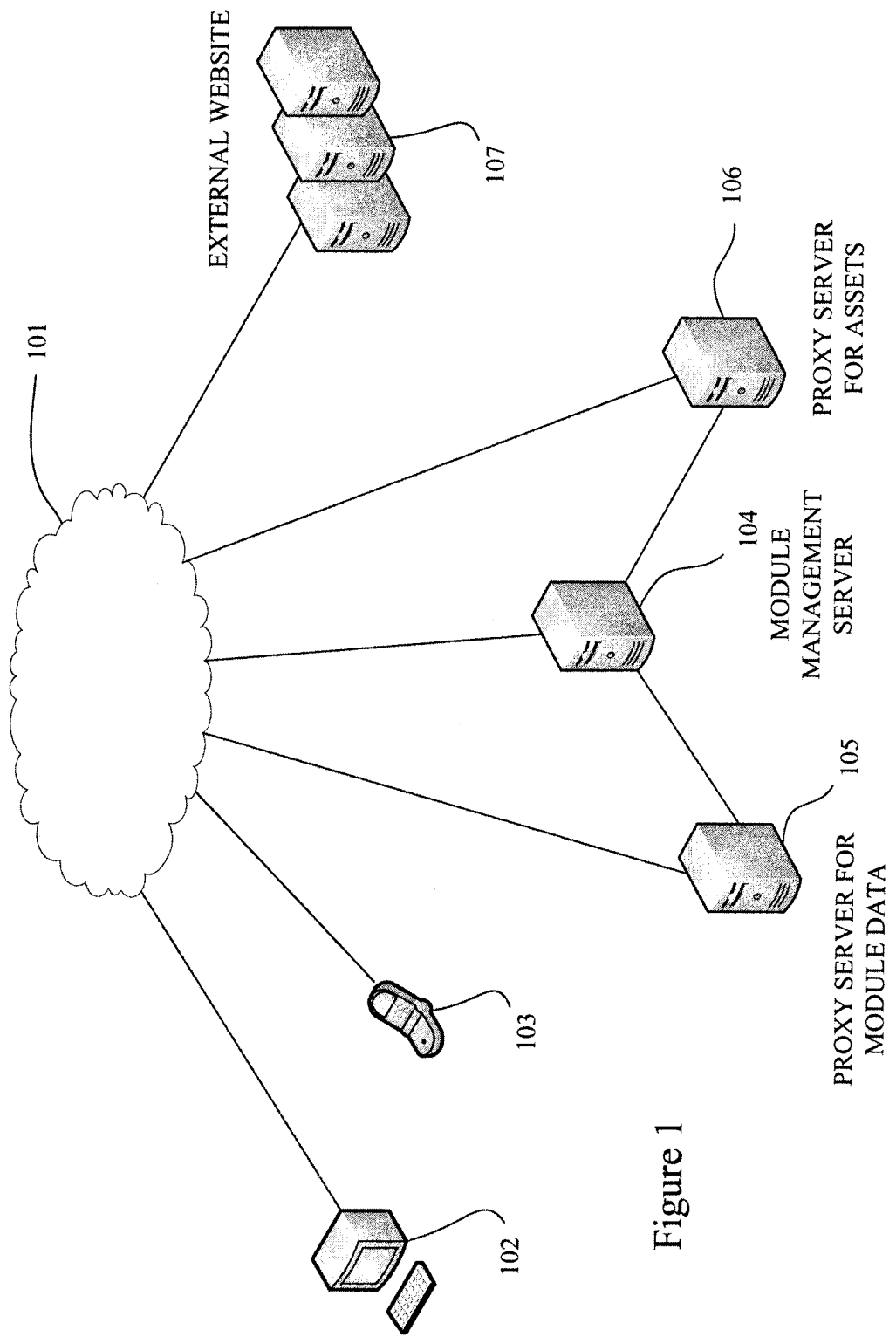
FIG. 1 is a simplified network diagram that illustrates a system for presenting modules in a browser, in accordance with an example embodiment.

FIG. 1 is a simplified network diagram that illustrates a system for the presentation of modules in a browser, in accordance with an example embodiment. As depicted in this figure, a personal computer 102 (which might be a laptop or other mobile computer) and a mobile device 103 (e.g., a smartphone such as an iPhone, Blackberry, Android, etc.) are connected by a network 101 (e.g., a wide area network (WAN) including the Internet, which might be wireless in part) with a module management server 104 and an external website 107 with its own servers. In turn, the module management server 104 is connected by a network (e.g., a local area network (LAN) or a WAN) with a proxy server 105 that caches module data and a proxy server 106 that caches asset files (or resource files). Module management server 104 might be one of many servers in a distributed system of servers, e.g., in a data center supported by a storage area network (SAN). This is also true of proxy server 105 and proxy server 106 and the servers for the external website 107. In an alternative example embodiment, external website 107 might be actually be an internal website, e.g., an internal website that serves advertisements or other content. Module management server 104 and proxy servers 105 and 106 might be under the control of a provider or website, such as Yahoo! or Google, which retrieves and presents (e.g., through visual display or audio playback) information to browsers (e.g., applications such as web/Internet browsers or intranet browsers) running on client devices such as personal computer 102 and mobile device 103, in an example embodiment.

In an example embodiment, personal computer 102 and servers 104, 105, and 106 might include (1) hardware consisting of one or more microprocessors (e.g., from the x86 family or the PowerPC family), volatile memory (e.g., RAM), and persistent storage (e.g., a hard disk or network access to a SAN) and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile memory (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser.

Finally in this regard, module management server 104 might consist of multiple networked physical servers having different software for interfacing with other entities depicted in FIG. 1, in an example embodiment. For example, module management server 104 might actually be two physical servers, one of which has software for interfacing with the personal computer 102 and the mobile device 103 and one of which has software for interfacing with the proxy servers 105 and 106.

Similarly, in an example embodiment, each of the proxy servers 105 and 106 might consist of multiple networked physical servers having different software for interfacing with other entities depicted in FIG. 1. For example, proxy server 105 (or proxy server 106) might actually be two physical servers, one of which has software for interfacing with module management server 104 and one of which has software for interfacing with the physical servers on external website 107 (which might be an internal website, as discussed above).

Figure 2:
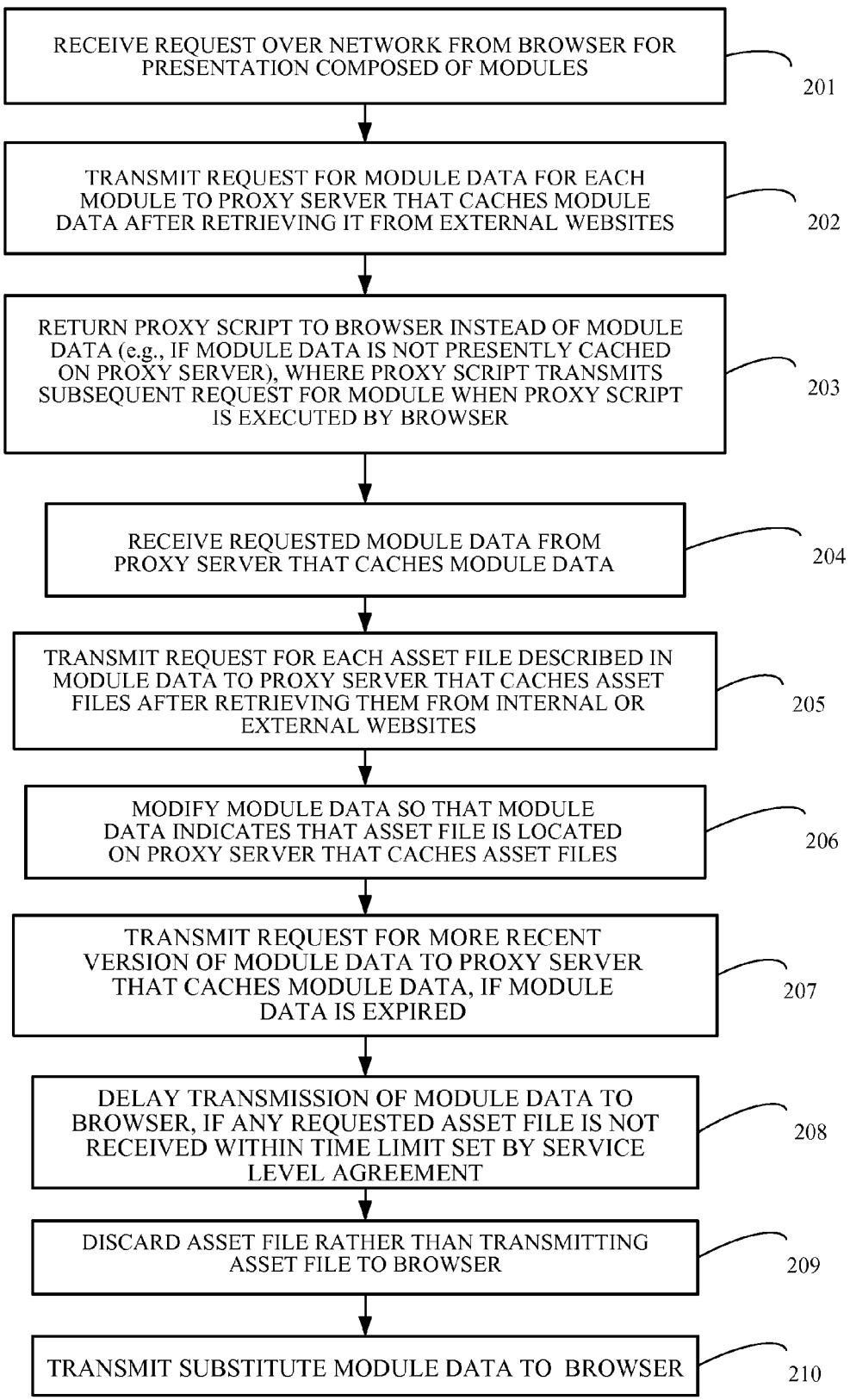
FIG. 2 is a flowchart diagram that illustrates a process for managing the presentation of modules in a browser, in accordance with an example embodiment.

FIG. 2 is a flowchart diagram that illustrates a process for managing the presentation of modules in a browser, in accordance with an example embodiment. This process might be performed by software executing on module management server 104. However, in an alternative embodiment, some of the operations of the process might be performed by proxy servers 105 and 106. In additional alternative example embodiments, other suitable modularizations and/or distributions of the operations described below might be employed.

As depicted in FIG. 2, the module management software receives a request over a network from a browser for a presentation composed of modules, in operation 201. An example of such a presentation is a web page (e.g., a home page for a web portal) whose modules might include other web pages that have assets such as images, audio recordings, video recordings, and/or other rich media. An example of such a module is a Wikipedia article or a rich multimedia advertisement. It will be appreciated that a module typically includes statements in a markup language (e.g., HTML or XML) or a style sheet language (e.g., Cascading Style Sheets or CSS) that describe the locations (e.g., using uniform resource locators or URLs) of files for assets (or resources).

In operation 202, the module management software transmits a request for module data associated with each module in the presentation to a proxy server (e.g., proxy server 105) that caches module data after retrieving it from external (or internal) websites. Then in operation 203, the module management software returns a proxy script to the browser instead of the module data, e.g., if the module data is not presently cached on the proxy server. The proxy script transmits a subsequent request for the module upon its execution by the browser, e.g., during presentation of the other modules. In an example embodiment, the proxy script might be written using JavaScript (JS) or any other EMCAScript. In operation 204, the module management software receives the requested module data from the proxy server that caches module data. Then, in operation 205, the module management software scans the module data for assets and transmits a request for each asset file described in the module data to a proxy server that caches asset files after retrieving them from external (or internal) websites. As noted above, assets include rich media such as images, audio recordings, and video recordings which might be associated with URLs, in an example embodiment. It will be appreciated that such asset files might use container or wrapper formats that facilitate the streaming of audio or video recordings. In an example embodiment, the module management software might use multiple threads to request each asset file, e.g., one thread per asset file, in order to achieve parallel execution.

In operation 206, the module management software modifies the module data so that module data indicates that asset file is located on the proxy server that caches asset files, rather than on an external website. In an example embodiment, this modification might involve changing the URL for the asset file so that it refers to the proxy server rather than an external website. In operation 207, the module management software transmits a request for a more recent version of the module data to the proxy server that caches module data, if the module data is expired. It will be appreciated that this operation might be performed earlier in the flowchart diagram, in an alternative example embodiment, for example, right after operation 204.

In operation 208, the module management software delays transmission of the module data to the browser, if any requested asset file is not received within a time limit set for a specific web page by a service level agreement (SLA). An example of such an SLA time limit might be 800 milliseconds. The SLA might require compliance with this time limit 99.85% of the time.

In operation 209, the module management software discards the asset file rather than transmitting the asset file to the browser. As will be described in further detail below, the browser retrieves its own asset files. One might think of retrieval of the asset file by the module management software as a test run that primes the cache for asset files. Then, in operation 210, the module management software transmits substitute module data to the browser, in place of the module data whose transmission has been delayed, in some example embodiments. In alternative example embodiments, other remedial measures might be taken by the module management software when it delays transmission of module data. For example, if the withheld module data relates to a display, the module management software might cause the browser to enlarge other displays to hide the missing module or move the missing module "below the fold" (e.g., to that part of the display that the user can only view by scrolling).

Figure 3A:
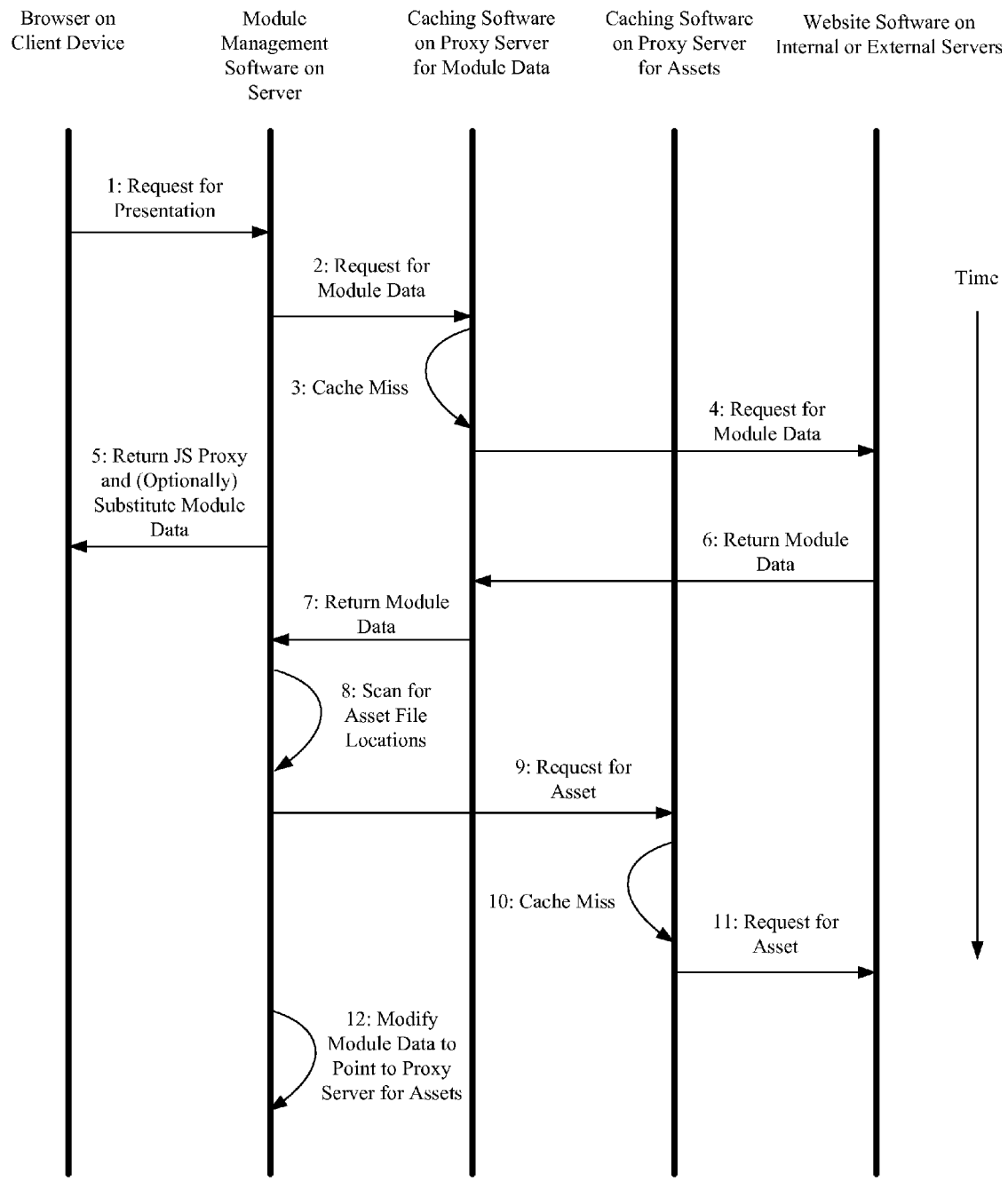
FIGS. 3A and 3B are sequence diagrams that illustrate a process for managing the presentation of modules in a browser, in accordance with an example embodiment.
Figure 3B:
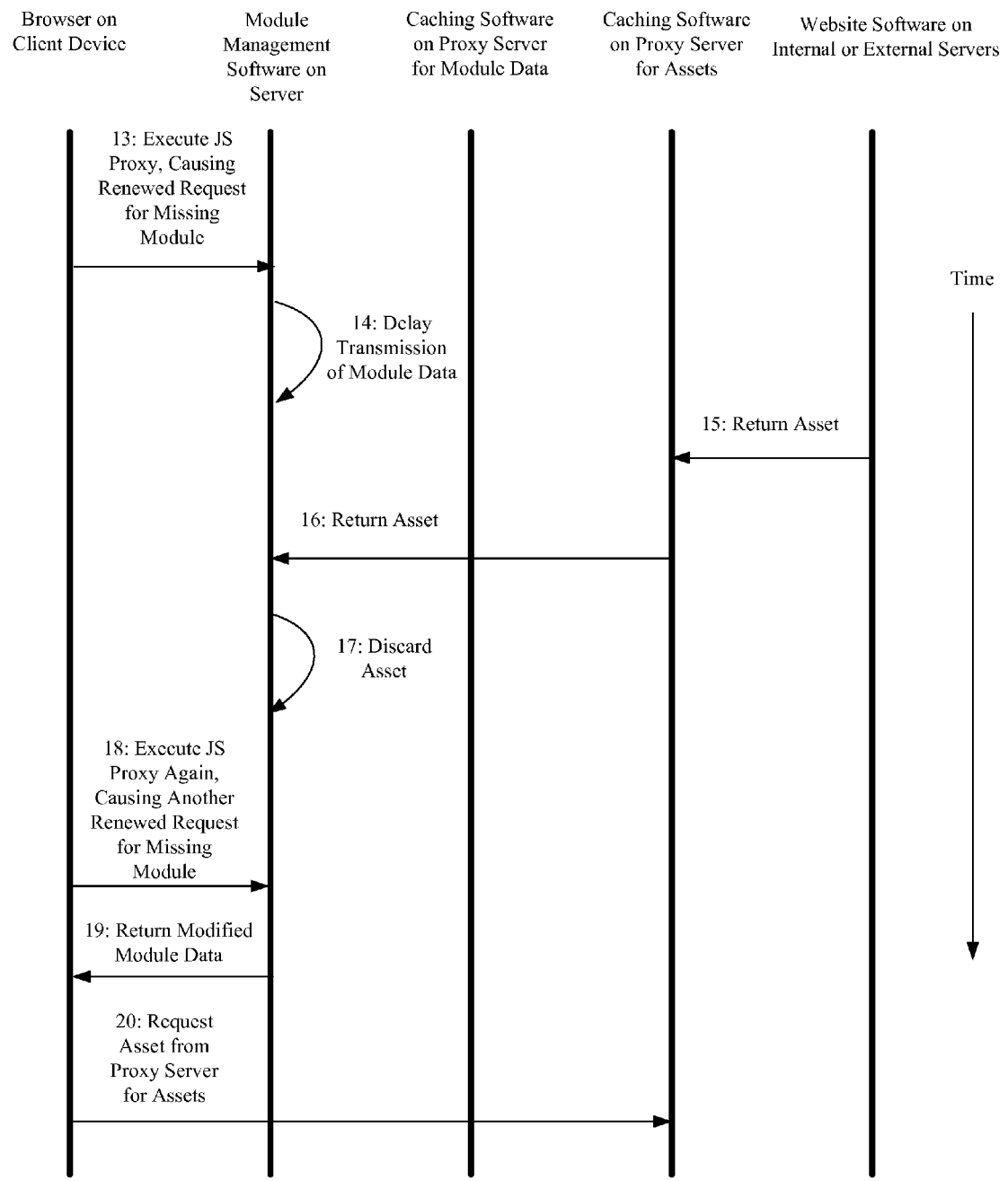

FIGS. 3A and 3B are sequence diagrams that illustrate a process for managing the presentation of modules in a browser, in accordance with an example embodiment. It will be appreciated that the operations shown in these sequence diagrams describe many of the same operations described in the flowchart depicted in FIG. 2, without a focus on the module management software. As noted on the right hand side of FIGS. 3A and 3B, time increases from the top of the figure to the bottom of the figure.

As depicted in FIG. 3A, the first operation 1 is a request for a presentation, with the request going from a browser on a client device to module management software on a server. Operation 2 is a request for module data associated with a module in the presentation, with the request going from the module management software to caching software (e.g., Web caching software such as Squid or Yahoo! Traffic Server) on the proxy server that caches module data. As shown in operation 3, there is a cache miss on the proxy server that caches module data. That is, the module data is not presently in storage (e.g., volatile or persistent) on that proxy server. So in operation 4, the caching software on that proxy server requests the module data from an external website.

Meanwhile (or thereafter as depicted in FIG. 3A) in operation 5, the module management software returns a JS proxy to the browser, e.g., if the SLA cannot be met, which will result in a subsequent request for the missing module. Optionally, the module management software might also return substitute module data to the browser, as discussed earlier in relation to FIG. 2. In operation 6, the website software on the external (or internal) website returns the missing module data to the caching software on the proxy server that caches module data. Then in operation 7, the caching software on the proxy server returns the missing module data to the module management software. The module management software scans the module data for assets (e.g., URLs for rich media such as images, video, and audio), in operation 8. Then in operation 9, the module management software requests an asset file from the caching software (e.g., Web caching software such as Squid or Yahoo! Traffic Server) on the proxy server that caches asset files. As previously noted, the module management software might employ one thread per asset file to increase parallel execution.

As shown in operation 10, there is a cache miss on the proxy server that caches asset files. That is, the asset file is not presently in storage (e.g., volatile or persistent) on that proxy server. So in operation 11, the caching software on that proxy server requests the module data from an external (or internal) website. Meanwhile (or thereafter as depicted in FIG. 3A) in operation 12, the module management software modifies the locations (e.g., URLs) of the asset files in the module data so that the locations are on the proxy server that caches asset files, rather than on external (or internal) websites.

FIG. 3B describes the remaining operations. In operation 13, the browser executes the JS proxy, when displaying the other modules in the presentation. This execution of the script results in a renewed request from the browser to the module management software for the module. In operation 14, the module management software delays transmission of the module data to the browser though it has been received, since the module management software has not yet received the missing asset file. Meanwhile (or thereafter as depicted in FIG. 3B) in operation 15, the website software on the external (or internal) website returns the missing asset file to the caching software on the proxy server that caches asset files. Then in operation 16, the caching software on that proxy server returns the missing asset file to the module management software. In operation 17, the module management software discards the asset file since the browser retrieves its own asset files. The browser executes the JS proxy again in operation 18, when displaying the other modules in the presentation. This execution of the script results in another renewed request from the browser to the module management software for the module. This time, the module management software returns the modified module data in operation 19, since the module management software has received the missing asset file and therefore has evidence that any time limit in an SLA pertaining to the asset can be met. Then in operation 20, the browser scans the modified module data and requests the asset file from the proxy server for asset files, rather than from an external (or internal) website. Thereafter, the browser will present the full presentation including all modules to the user, though this is not depicted in the figures.

As described with reference to the sequence diagrams in FIGS. 3A and 3B, the proxy servers that cache module data and asset files execute caching software. It will be appreciated that such proxy servers might be general purpose servers, in an example embodiment. In an alternative example embodiment, those proxy servers might be appliances.

Figure 4:
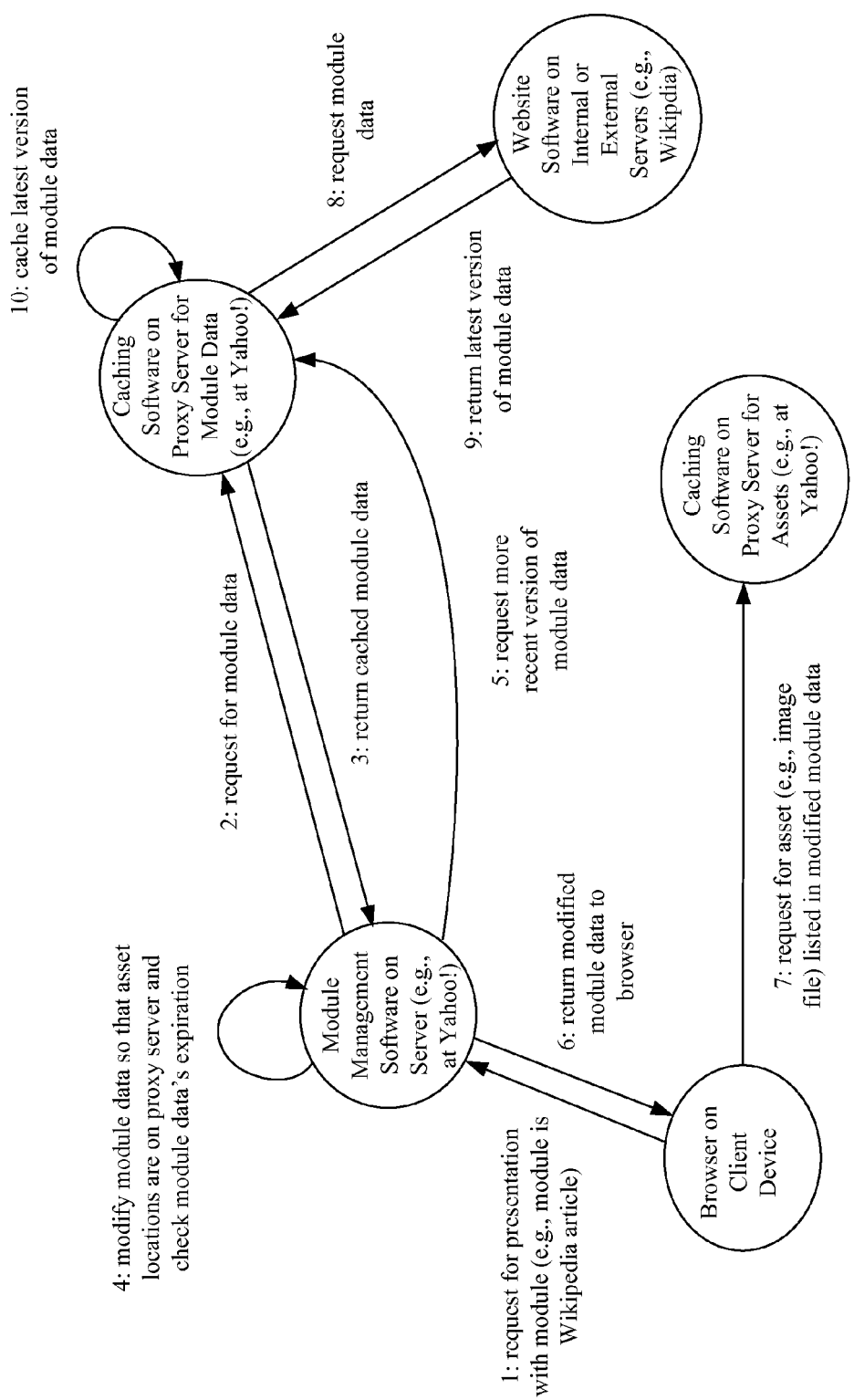
FIG. 4 is a communication diagram that illustrates a process requesting a more recent version of module data, in accordance with an example embodiment.

FIG. 4 is a communication diagram that illustrates a process requesting a more recent version of module data, in accordance with an example embodiment. The first operation 1 in FIG. 4 is a request for a presentation which includes a module (e.g., the module is a Wikipedia article), with the request going from a browser on a client device to module management software on a server (e.g., at Yahoo!). Operation 2 is a request for module data associated with the module, with the request going from the module management software to caching software (e.g., Web caching software such as Squid or Yahoo! Traffic Server) on a proxy server that caches module data (e.g., at Yahoo!). In operation 3, the caching software on that proxy server returns the cached module data to the module management software. In operation 4, the module management software (i) modifies the module data so that asset file locations are on a proxy server that caches asset files (e.g., at Yahoo!) and (ii) checks the module data's expiration against a freshness policy (e.g., an expiry algorithm) that depends, among other things, upon the frequency with which the module's content changes (e.g., as measured by monitoring software). For example, if the module's content includes stock quotes or sports scores, the expiration time for the module data might be relatively short. Conversely, if the module is a Wikipedia article that seldom changes, the expiration time for the module data might be relatively long.

Having determined that the module data is expired, the module management software requests a more recent version of the module data from the proxy server that caches module data, in operation 5. Meanwhile (or thereafter as depicted in FIG. 4) in operation 6, the module management software returns the modified module data to the browser. In operation 7, the browser scans the module data for assets and requests an asset file (e.g., an image file) from the caching software on the proxy server that caches asset files and the presentation to the user proceeds from that point. In operation 8, the caching software on the proxy server that caches module data requests the module data from an external (or internal) website. In operation 9, the website software on the external (or internal)

website returns the latest version of the module data. Then in operation 10, the caching software on the proxy server that caches module data caches the latest version of the module data.

It will be appreciated that in an example embodiment, the proxy server that caches module data and the proxy server that caches asset files might additionally have their own freshness policies (e.g., expiry algorithms), which flush cached files according to their age, size, and access history. In an example embodiment, the freshness policies used by the module management software and/or the proxy servers might include policies related to cache coherency, e.g., policies that would prevent the flushing of an asset file that is listed in an out-of-date module data that has been returned to browser, as in FIG. 5.

Figure 5A:
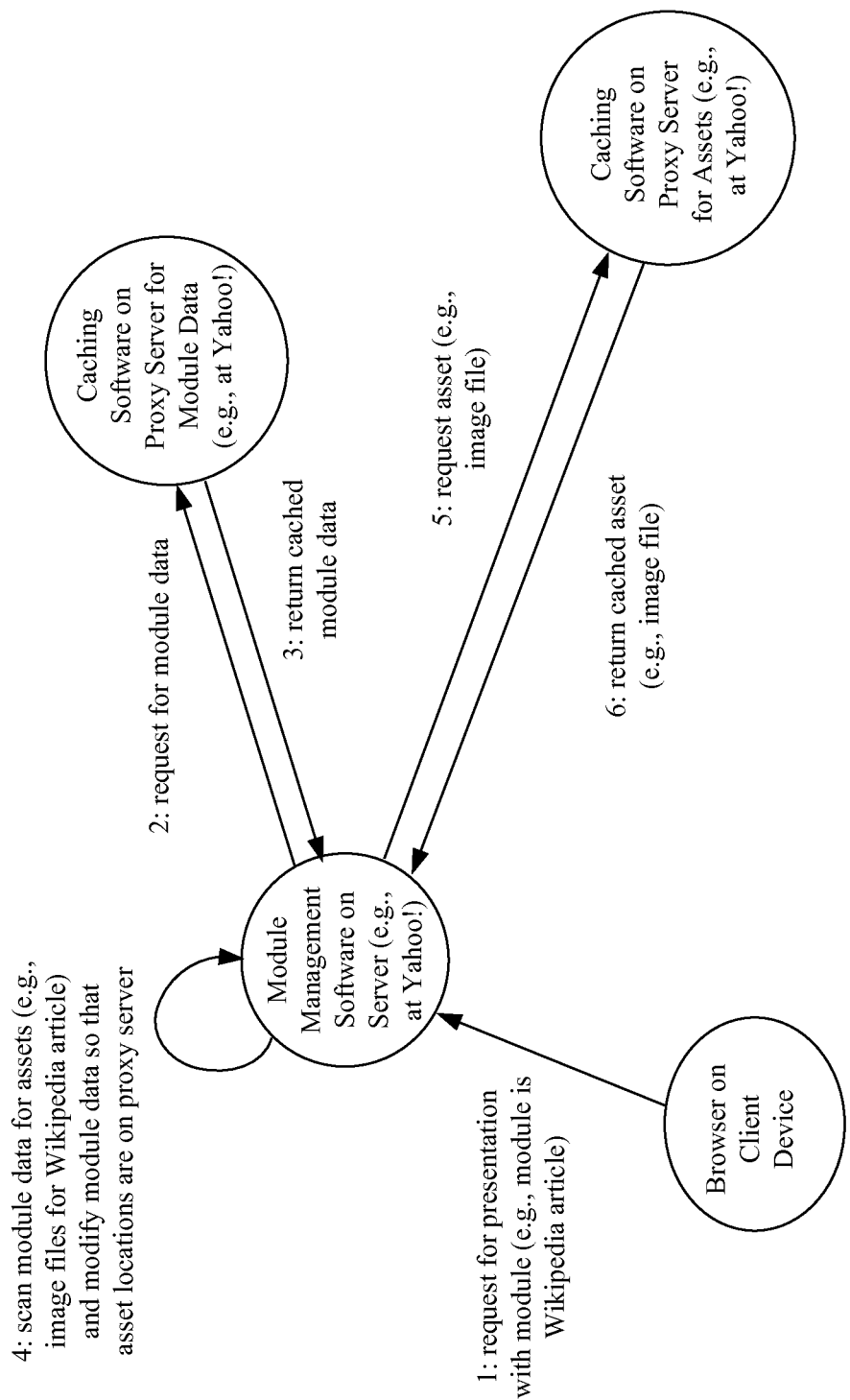
FIGS. 5A and 5B are communication diagrams that illustrate a process which involves no cache misses, in accordance with an example embodiment.
Figure 5B:
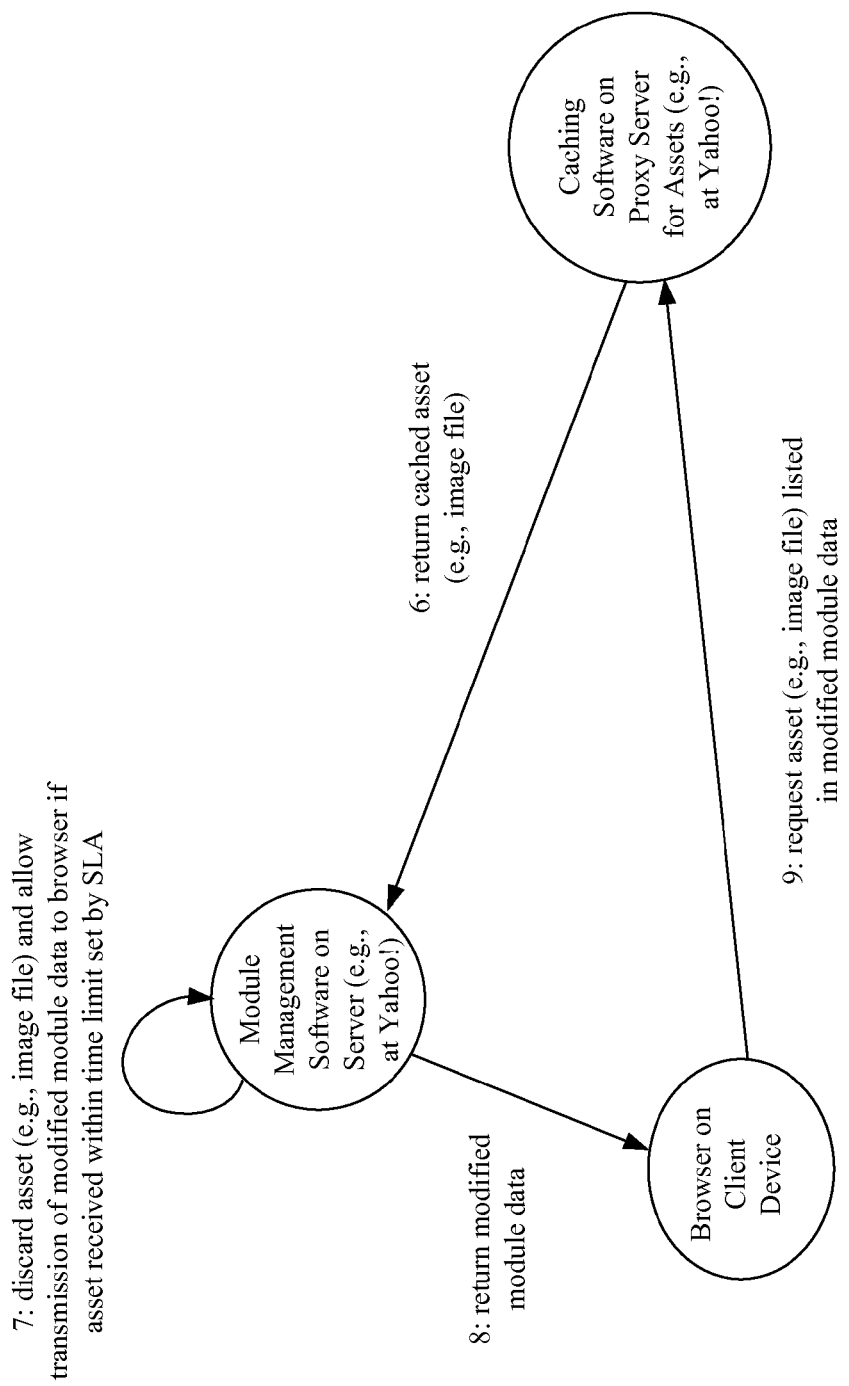

It will also be appreciated that the process described in the sequence diagrams in FIGS. 3A and 3B involved cache misses at both the proxy server that caches module data and the proxy server that caches asset files. FIGS. 5A and 5B are communication diagrams that illustrate a process which involves no cache misses at either of these proxy servers, in accordance with an example embodiment. The first operation 1 in FIG. 4 is a request for a presentation which includes a module (e.g., the module is a Wikipedia article), with the request going from a browser on a client device to module management software on a server (e.g., at Yahoo!). Operation 2 is a request for module data associated with the module, with the request going from the module management software to caching software (e.g., Web caching software such as Squid or Yahoo! Traffic Server) on a proxy server that caches module data (e.g., at Yahoo!). In operation 3, the caching software on that proxy server returns the cached module data to the module management software. In operation 4, the module management software scans the module data for assets and modifies the module data so that asset file locations are on a proxy server that caches asset files (e.g., at Yahoo!). Then in operation 5, the module management software requests an asset file (e.g., an image file) from caching software on a proxy server that caches asset files (e.g., at Yahoo!). In operation 6, the caching software returns the cached asset file to the module management software.

FIG. 5B describes the remaining operations. In operation 7, the module management software discards the asset file (e.g., the image file) and allows (or sets a flag to allow) the transmission of the modified module data to the browser, if the asset file was received within the time limit set by the SLA that pertains to the asset. Then in operation 8, the module management software returns the modified module data to the browser. In operation 9, the browser scans the module data for assets and requests an asset file (e.g., an image file) from the caching software on the proxy server that caches asset files and the presentation to the user proceeds from that point.

Figure 6A:
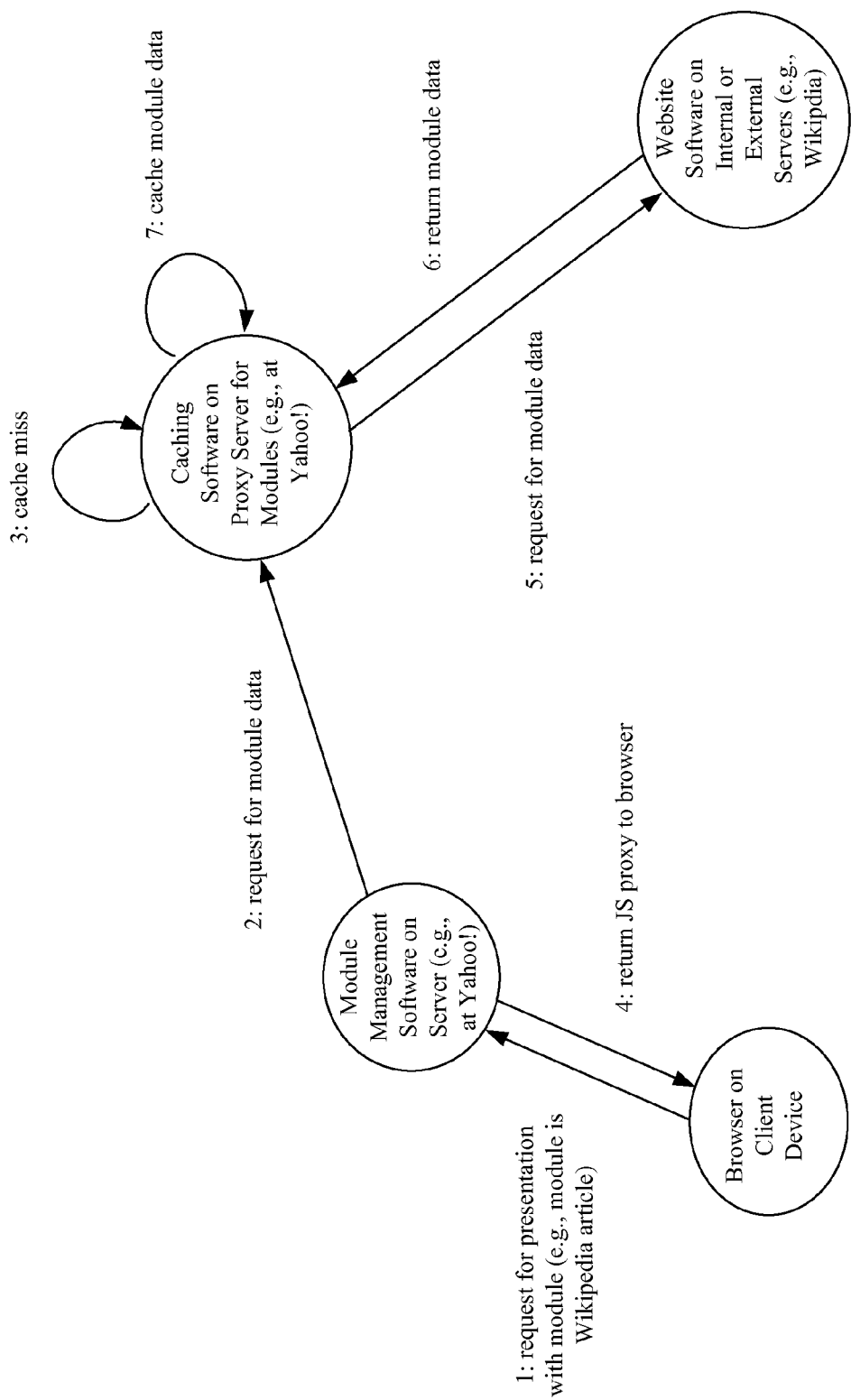
Figure 6B:
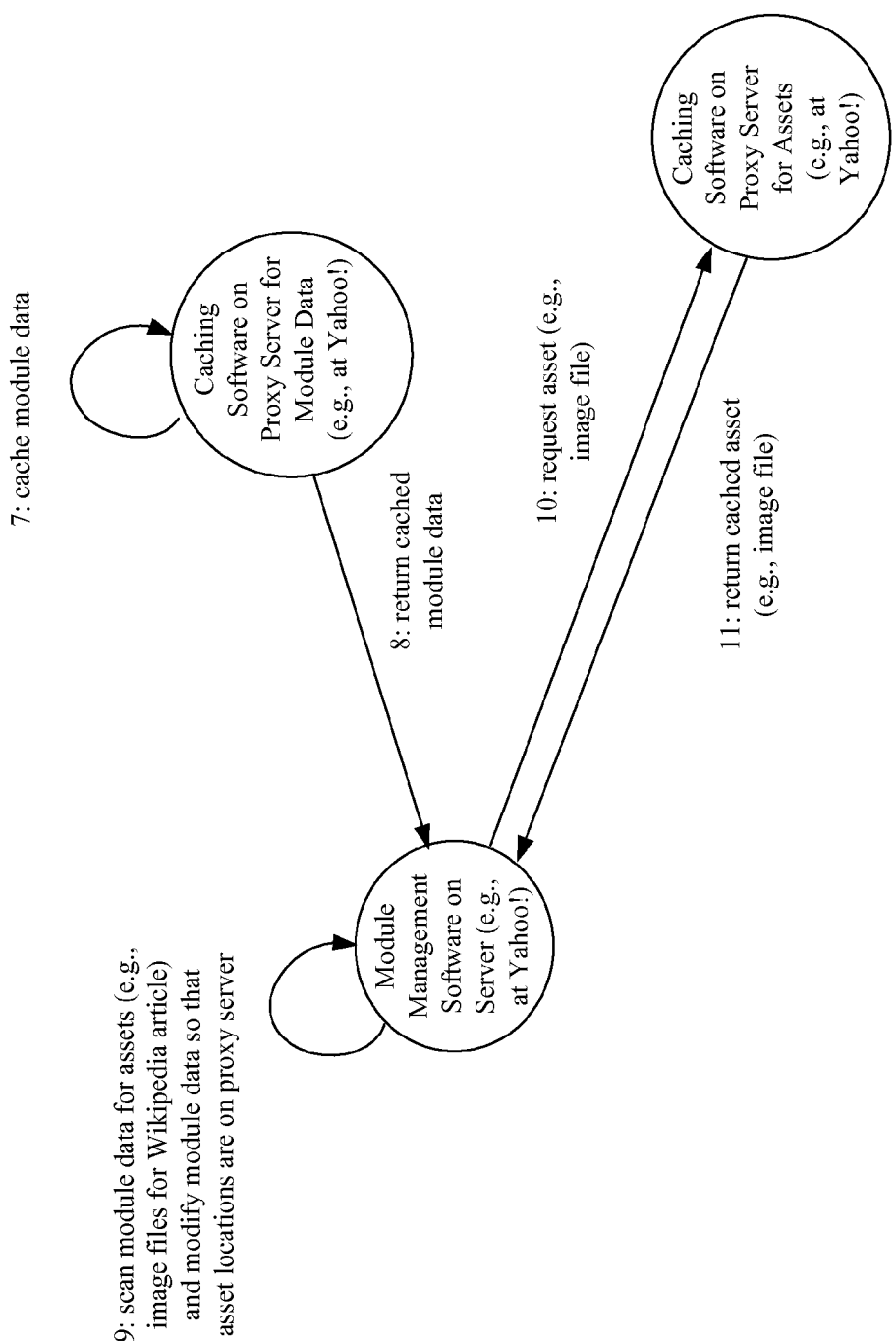

FIGS. 6A through 6C are communication diagrams that illustrate a process that involves a cache miss on a proxy server that caches module data, in accordance with an example embodiment. As depicted in FIG. 6A, the first operation 1 is a request for a presentation with a module (e.g., the module is a Wikipedia article), with the request going from a browser on a client device to module management software on a server (e.g., at Yahoo!). Operation 2 is a request for module data associated with a module, with the request going from the module management software to caching software (e.g., Web caching software such as Squid or Yahoo! Traffic Server) on the proxy server that caches module data (e.g., at Yahoo!). As shown in operation 3, there is a cache miss on the proxy server for module data. That is, the module data is not presently in storage (e.g., volatile or persistent) on that proxy server. In operation 4, the module management software returns a JS proxy (which will result in a subsequent request for the missing module) to the browser, in lieu of the missing module data. Then in operation 5, the caching software on the proxy server that caches module data requests the missing module data from an external (or internal) website. In operation 6, the website software at the external (or internal) website (e.g. Wikipedia) returns the module data. And in operation 7, the caching software on the proxy server that caches module data caches the module data.

FIG. 6B picks up with the caching operation, operation 7. In operation 8, the caching software on the proxy server that caches module data returns the cached module data to the module management software. Then in operation 9, the module management software scans the module data for assets (e.g., image files for the Wikipedia article) and modifies the module data so that asset file locations are on a proxy server that caches asset files. In operation 10, the module management software requests an asset file (e.g., an image file) from the caching software on the proxy server that caches asset files (e.g., at Yahoo!). The caching software on that proxy server returns the asset file (e.g., an image file) to the module management software, in operation 11.

FIG. 6C describes the remaining operations. In operation 12, the module management software discards the image file and allows (or sets a flag to allow) transmission of the modified module data to the browser, if the asset file was received within the time limit set by SLA pertaining to the asset. Then in operation 13, the browser proceeds with the presentation without the module. In operation 14, the browser executes the JS proxy, which causes a renewed request from the browser to the module management software for the module. Having received the asset file within the SLA's time limit, the module management software returns the modified module data to the browser, in operation 15. Then in operation 16, the browser scans the modified module data and requests an asset file (e.g., an image file) from the caching software on the proxy server that caches asset files and the presentation to the user proceeds from that point.

Figure 7A:
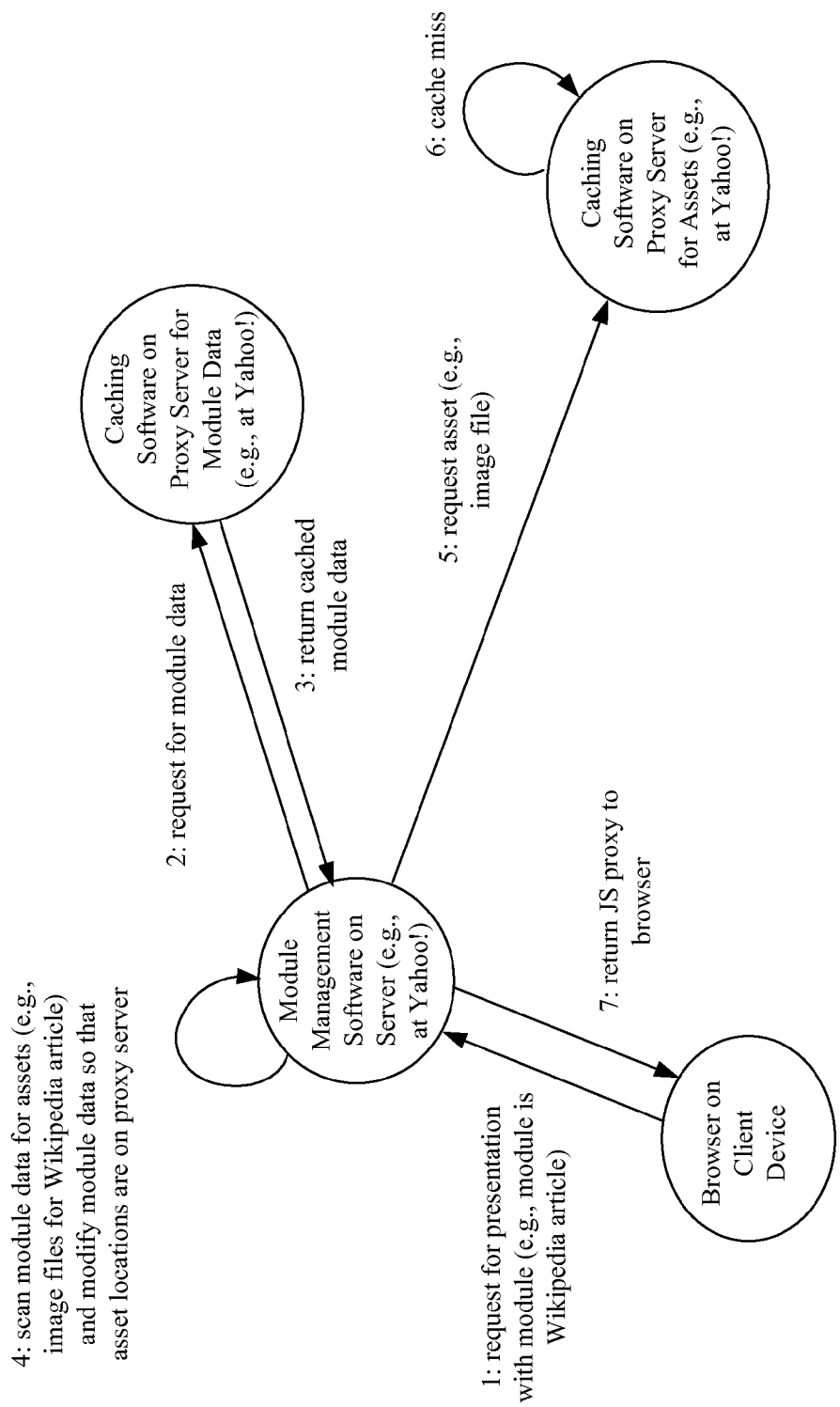
FIGS. 7A and 7B are communication diagrams illustrating a process that involves a cache miss on a proxy server that caches asset files, in accordance with an example embodiment.
Figure 7B:
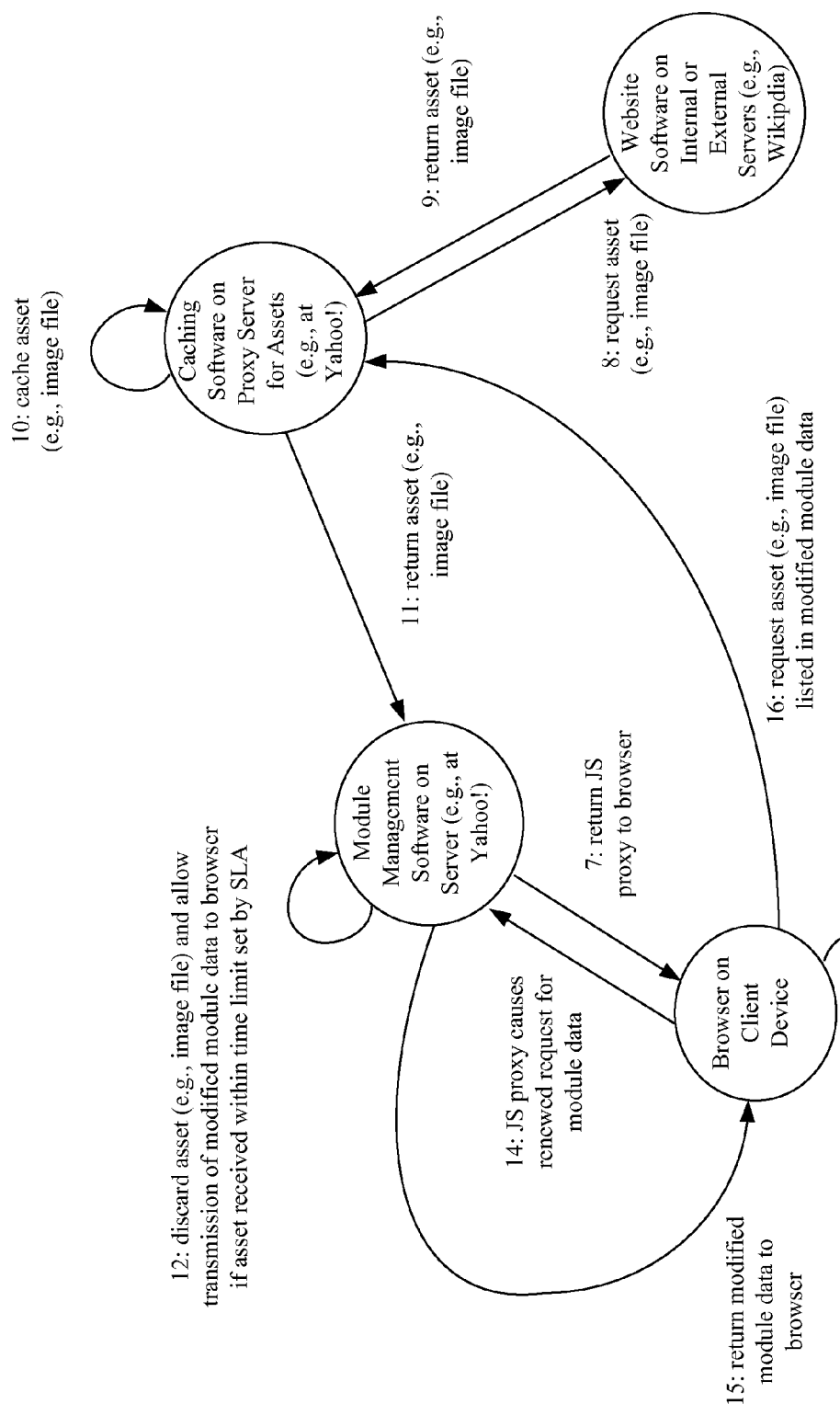

FIGS. 7A and 7B are communication diagrams illustrating a process that involves a cache miss on a proxy server that caches asset files, in accordance with an example embodiment. As depicted in FIG. 7A, the first operation 1 is a request for a presentation with a module (e.g., the module is a Wikipedia article), with the request going from a browser on a client device to module management software on a server (e.g., at Yahoo!). Operation 2 is a request for a module data associated with the module, with the request going from the module management software to caching software (e.g., Web caching software such as Squid or Yahoo! Traffic Server) on the proxy server that caches module data (e.g., at Yahoo!). In operation 3, the caching software on the proxy server that caches module data returns the cached module data to the module management software. Then in operation 4, the module management software scans the module data for assets (e.g., image files for the Wikipedia article) and modifies the module data so that asset file locations are on a proxy server that caches asset files. In operation 5, the module management software requests an asset file (e.g., an image file) from the caching software on the proxy server that caches asset files (e.g., at Yahoo!). As shown in operation 6, there is a cache miss on that proxy server. That is, the asset file is not presently in storage (e.g., volatile or persistent) on that proxy server. In operation 7, the module management software returns a JS proxy (which will result in a subsequent request for the missing module) to the browser, in lieu of the missing module data.

FIG. 7B describes the remaining operations. In operation 8, the caching software on the proxy server that caches asset files requests the asset file from an external (or internal) website. In operation 9, the website software on the external (or internal) website returns the missing asset file to the caching software on the proxy server that caches asset files. In operation 10, the caching software on that proxy server caches the asset file. Then in operation 11, the caching software on that proxy server returns the missing asset file to the module management software. In operation 12, the module management software discards the asset file (e.g., an image file) and allows (or sets a flag to allow) transmission of the modified module data to the browser, if the asset file was received within the time limit set by SLA pertaining to the asset. Then in operation 13, the browser proceeds with the presentation without the module. In operation 14, the browser executes the JS proxy, which causes a renewed request for the module to the module management software. Having received the asset file within the SLA's time limit, the module management software returns the modified module data to the browser, in operation 15. Then in operation 16, the browser scans the modified module data and requests an asset file (e.g., an image file) listed in the modified module data from the caching software on the proxy server that caches asset files and the presentation to the user proceeds from that point.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the invention have been described in some detail for purposes of clarity of understanding, it will be apparent that certain changes and modifications can be practiced within the scope of the following claims. For example, the proxy server that caches module data might be combined with the proxy server that caches assets, in an example embodiment. Further, the operations described above can be modularized and/or distributed in any suitable way. Accordingly, the present embodiments are to be considered as illustrative and not restrictive, and the invention is not to be limited to the details given herein, but may be modified within the scope and equivalents of the following claims. In the following claims, elements and/or steps do not imply any particular order of operation, unless explicitly stated in the claims or implicitly required by the specification and/or drawings.

What is claimed is:

1. A method for managing a presentation in a browser executing on a client device, comprising:
   receiving a request from the browser for a presentation composed of at least one module;
   transmitting a request for data associated with the module to a first server that caches module data after retrieving module data from a website;
   receiving the requested module data from the first server;
   transmitting a request for each of the resource files described in the module data to a second server that caches each of the resource files after retrieving the resource file from a website;
   receiving each of the requested resource files and discarding each of the received resource files without transmission to the browser;
   modifying the module data so that the module data indicates that each of the resource files is located on the second server; and
   delaying transmission of the module data to the browser, if any requested resource file is not received within a time limit derived at least in part from a service level agreement, wherein each operation of the method is executed by a processor.

2. The method of claim 1, further comprising the method operation of:
   returning a proxy script to the browser instead of the module data, wherein the proxy script, when executed by the browser, transmits a subsequent network request for the module.

3. The method of claim 1, further comprising the method operation of:
   causing the browser to move the at least one module below the fold.

4. The method of claim 1, wherein the resource files described in the module data are rich media.

5. The method of claim 1, further comprising the method operation of:
   transmitting a request to the first server for a more recent version of the module data if the module data is expired.

6. The method of claim 1, wherein the module data includes a statement in a markup language.

7. The method of claim 1, wherein the module data includes a statement in a style sheet language.

8. The method of claim 1, further comprising the method operation of:
   transmitting substitute module data to the browser.

9. The method of claim 2, wherein the proxy script is a JavaScript.

10. The method of claim 1, wherein a parallel thread is used for the network request to the second server for the resource file.

11. The method of claim 1, further comprising the method operation of:
causing the browser to enlarge displays to hide the at least one module that is missing.

12. A computer-readable storage medium with an executable program persistently stored thereon, wherein the program, when executed, instructs a processor to perform the following operations:
receive a request from the browser for a presentation composed of at least one module;
transmit a request for module data associated with the module to a first server that caches module data after retrieving module data from a website;
receive the requested module data from the first server;
transmitting a request for each of the resource files described in the module data to a second server that caches each of the resource files after retrieving the resource file from a website;
receive each of the requested resource files and discard each of the received resource files without transmission to the browser;
modify the module data so that the module data indicates that each of the resource files is located on the second server; and
delay transmission of the module data to the browser, if any requested resource file is not received within a time limit derived at least in part from a service level agreement.

13. The computer-readable storage medium of claim 12, further comprising the operation of:
return a proxy script to the browser instead of the module data, wherein the proxy script, when executed by the browser, transmits a subsequent network request for the module.

14. The computer-readable storage medium of claim 12, further comprising the operation of:
cause the browser to move the at least one module below the fold.

15. The computer-readable storage medium of claim 12, further comprising the operation of:
transmit a network request for a more recent version of the module data to a website if the module data is expired.

16. The computer-readable storage medium of claim 12, further comprising the operation of:
transmit substitute module data to the browser.

17. The computer-readable storage medium of claim 13, wherein the proxy script is a JavaScript.

18. The computer-readable storage medium of claim 12, wherein a parallel thread is used for the network request to the second server for the resource file.

19. A method for managing a presentation in a browser executing on a client device, comprising:
receiving a request from the browser for a presentation composed of at least one module;
transmitting a request for data associated with the module to a first server that caches module data after retrieving module data from an external website;
receiving the requested module data from the first server;
transmitting a request for each of the resource files described in the module data to a second server that caches each of the resource files after retrieving the resource file from an external website;
receiving each of the requested resource files and discarding each of the received resource files without transmission to the browser;
modifying the module data so that the module data indicates that each of the resource files is located on the second server;
discarding the resource file rather than transmitting the resource file to the browser; and
delaying transmission of the module data to the browser, if any requested resource file is not received within a time limit derived at least in part from a service level agreement, wherein each operation of the method is executed by a processor.

20. The method of claim 19, further comprising the method operation of:
causing the browser to enlarge displays to hide the at least one module that is missing.

* * * * *